United States Patent [19]

Nedzu

[11] Patent Number: 4,943,459
[45] Date of Patent: Jul. 24, 1990

[54] HEAT-RESISTANT COMPOSITE SHEET AND CONTAINER FORMED OF THE SAME

[75] Inventor: Shigeru Nedzu, Shizuoka, Japan

[73] Assignee: Polyplastics Co., Ltd., Osaka, Japan

[21] Appl. No.: 363,481

[22] Filed: Jun. 7, 1989

[30] Foreign Application Priority Data

Jun. 29, 1988 [JP] Japan .................................. 63-161458

[51] Int. Cl.⁵ .............................................. B32B 3/26
[52] U.S. Cl. .................................. 428/36.5; 428/213; 428/313.5; 428/314.4; 428/319.3
[58] Field of Search ...................... 428/36.5, 213, 313.3, 428/313.5, 314.4, 314.8, 319.3

[56] References Cited

U.S. PATENT DOCUMENTS 2,908,602 10/1959 Collardeau et al. ............. 428/319.3
3,649,437 3/1972 Wolinski et al. ................. 428/314.4

Primary Examiner—William J. Van Balen
Attorney, Agent, or Firm—Nixon & Vanderhye

[57] ABSTRACT

A heat-resistant composite sheet includes, as the main constituents, either a foamed polystyrene sheet and a polybutylene terephthalate resin film, or a foamed polystyrene sheet, a polystyrene resin film and a polybutylene terephthalate resin film, wherein the polybutylene terephthalate resin film layer is laminated to form one, and preferably both of the outer layers.

4 Claims, 1 Drawing Sheet

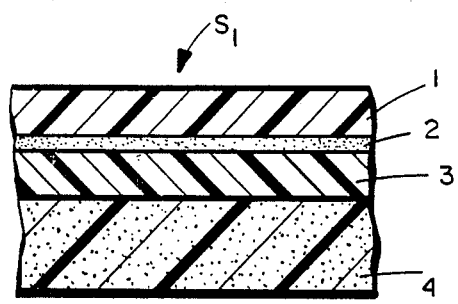
FIG. 1
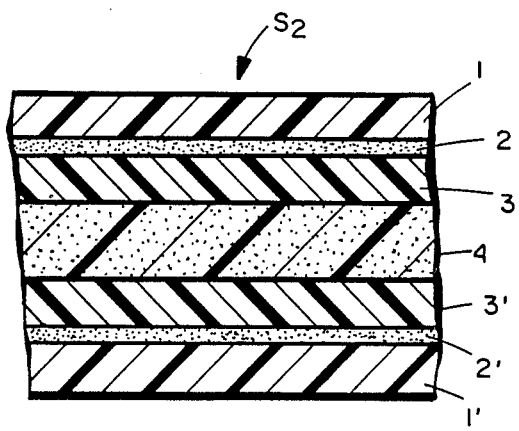
FIG. 2
FIG. 3
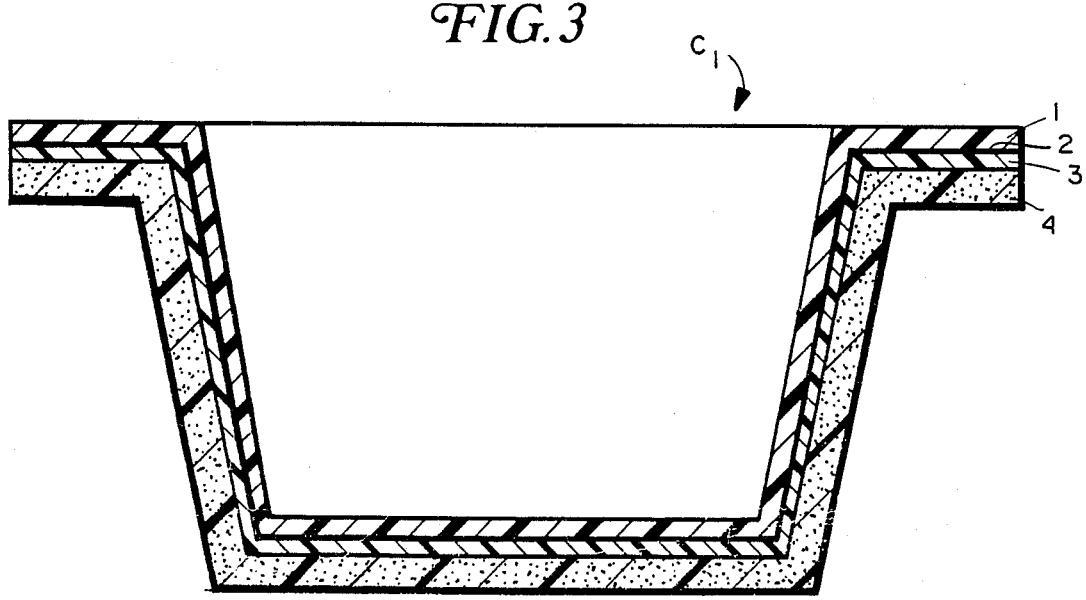

HEAT-RESISTANT COMPOSITE SHEET AND CONTAINER FORMED OF THE SAME

The present invention relates to a heat-resistant composite sheet and a heat-resistant container made of the same. More particularly, the present invention relates to a composite sheet for a heat-resistant container, which can withstand cooking when heated in a microwave oven or the like without detriment to the taste or flavor of the cooked food and which exhibits excellent heat insulation after cooking. The invention also relates to a heat-resistant container made of this composite sheet.

BACKGROUND AND SUMMARY OF THE INVENTION

Containers made of foamed lightweight polystyrene sheet exhibiting excellent heat resistance, rigidity and buffering properties have been extensively used as containers for fast foods, such as hamburgers, fried chicken and carryout box lunches and as containers for instant foods, such as precooked Chinese noodles and soup mixes. These containers are prepared by heat-forming a foamed polystyrene sheet alone or a composite sheet comprising a laminate of a foamed polystyrene sheet and another resin film. However, since these containers have various defects, they are not satisfactory as food containers. More specifically, since foamed polystyrene sheet alone or a composite sheet composed of a polystyrene resin film and a foamed polystyrene sheet has poor heat resistance, food packaged in a container made of such materials cannot be directly heated by cooking in a microwave oven. And because of the inherent odor of polystyrene) its use is considerably limited Although a composite sheet comprising a laminate of a foamed polystyrene sheet with a polyethylene resin film or polypropylene resin film improves in the heat resistance to some extent over the above-mentioned laminate sheet, the heat resistance is still insufficient so that it is not suitable for containing of an oily foods to be cooked in a microwave oven, because the temperature of the food often exceeds 100° C., a temperature which the above-mentioned composite sheet cannot withstand. Moreover, the above-mentioned olefins have a strong, so-called olefinic odor so that they might impair the taste or flavor of the food unfavorably. A composite sheet composed of a foamed polystyrene sheet and a nonoriented polyethylene terephthalate film is advantageous in that the taste and flavor of the food are not impaired, but its heat resistance is poor. A composite sheet composed of a foamed polystyrene sheet and a biaxially or monoaxially oriented polyethylene terephthalate film is excellent in the heat resistance and is tasteless and odorless. However, when such a composite sheet is heat-formed, the polyethylene terephthalate film layer causes delamination or breaks so that no containers cannot be satisfactorily prepared. Thus, the known composite sheets are insufficient for use as a heat-resistant food container.

According to the present invention, a polybutylene terephthalate resin film is providing having high heat resistance and rigidity, excellent formability, low oxygen permeability and excellent flavor retention. The polybutylene terephthalate film does not impair, the taste or aroma of the food in contact therewith because the film itself is tasteless and odorless. It has also been found that a composite sheet composed either of a foamed polystyrene sheet and a polybutylene terephthalate resin film, or of a foam polystyrene sheet, a polystyrene resin film and a polybutylene terephthalate resin film exhibits excellent heat resistance and heat-insulating properties, in addition to good formability properties which enable it to be formed into a container. And, since the oxygen permeability of such composite sheet is low, a container made of the same provides an excellent means for preserving foods.

BRIEF DESCRIPTION OF THE ACCOMPANYING DRAWING

Reference will hereinafter be made to the accompanying drawing wherein:

FIG. 1 is a diagrammatic cross-sectional view of one embodiment of a heat-resistant composite sheet according to this invention;

FIG. 2 is a diagrammatic cross-sectional view of another embodiment of a heat-resistant composite sheet according to this invention; and FIG. 3 is a diagrammatic cross-sectional view of a heat-resistant container formed of the composite sheet shown in FIG. 1.

DETAILED DESCRIPTION OF THE PREFERRED EMBODIMENTS

According to the present invention, a heat-resistant composite sheet is provided which includes, as the main constituents, either a foamed polystyrene sheet and a polybutylene terephthalate resin film, or a foamed polystyrene sheet, a polystyrene resin film and a polybutylene terephthalate resin film, wherein the polybutylene terephthalate resin film layer is laminated to form both or one of the outer layers.

The composite sheet of this invention exhibits excellent heat resistance and heat-insulating properties in its use and has good formability properties that allow it to be formed into a container.

In a specific embodiment, the composite sheet of this invention includes three-layer structure comprising a polybutylene terephthalate resin film 1, an adhesive layer 2, a polystyrene resin film 3 and a foamed polystyrene sheet 4, which are laminated in this order as shown in FIG. 1. Accompanying FIG. 2 shows a five-layer structure comprising a polybutylene terephthalate resin film 1, a first adhesive layer 2, a first polystyrene resin film 3, a foamed second polystyrene sheet 4, a polystyrene resin film 3', a second adhesive layer 2', and a second polybutylene terephthalate resin film 1', which are laminated in that order. It is indispensable in the present invention that the respective layers should be laminated so that the polybutylene terephthalate resin film forms one, and preferably both of the outer layers.

In the step of forming the composite sheet into a container, it is essential that the polybutylene terephthalate resin film should be located on the inner side of the container. In the container thus constructed, food contained therein can be directly heated for cooking in a microwave oven, and therefore the container is especially suitable for containing microwavable foods. Moreover, since the container exhibits an excellent heat-insulating property, the cooked food can be kept warm for a long time after cooking, and the container can be held by the user's bare hands even if the temperature of the food within the container is high. Furthermore, the container is advantageous in that the flavor retention is good and heat sealing is possible.

The polybutylene terephthalate referred to in the present invention is a polyester obtained by condensing 1,4-butanediol with terephthalic acid or a lower alcohol ester thereof. A copolymer composed mainly of polybutylene terephthalate can also be used.

Either the inflation process or the T-die process can be adopted for forming this polybutylene terephthalate into a film. However, when the inflation process is employed, it is preferred from the a film productivity point of view that the polybutylene terephthalate resin have an inherent viscosity of at least 1.0 be used.

In the present invention, either an oriented film or a non-oriented film can be used as the polybutylene terephthalate resin film, but in view of the fact that so-called deep drawing is carried out in order to form of a container, it is essential that the film's elongation at the deep drawing temperature (100° to 120° C.) should be at least about 200%. For this reason, the use of a nonoriented film is especially preferred. However an oriented film can be used if the draw ratio is lower than 1.5.

The polybutylene terephthalate resin may contain known substances which are typically incorporated into ordinary thermoplastic and thermosetting resins, for example, plasticizers, stabilizers such as antioxidants and ultraviolet absorbers, antistatic agents, surface active agents, colorants such as dyes and pigments, lubricants for improving the flowability, and crystallization promoters (nucleating agents) so as to obtain desired resin properties. However, none of these additive should be attained, namely, when these substances are not extracted by the contained food or otherwise contaminate the contained food when the food (which is in contact with the container) is cooked in a microwave oven. Furthermore, small amounts of other thermoplastic resins or inorganic fillers may optionally be used as needed, provided that as the beneficial effects of the present invention are not hindered.

Foamed polystyrene sheets customarily used for forming packages or the like can be used in the present invention, and thus the type of foamed polystyrene sheet is not particularly critical. For example, a foamed polystyrene sheet obtained by foaming and molding formable polystyrene beads comprising a lower hydrocarbon, such as butane, pentane or hexane, absorbed in a polystyrene resin or a copolymer or blend thereof with other thermoplastic resin may be used. In addition, a foamed sheet obtained by melt-kneading a polystyrene resin with a foaming agent as mentioned above directly in an extruder to effect foaming may also be used.

In general, a foamed polystyrene sheet having a foaming ratio of 30 to 50, which is prepared by the above-mentioned process, is often used for packages or the like.

The type of polystyrene resin film used in the present invention is not particularly critical. In this regard, polystyrene resin films customarily used for formation of packages can be used in the present invention In the foamed sheet, an unfoamed film of a thermoplastic resin such as a high-impact polystyrene film can be laminated on the surface of the side to which the polybutylene terephthalate resin film is not bonded.

An adhesive customarily used for ordinary synthetic resin sheet or film can be used for laminating of the polybutylene terephthalate film and the polystyrene resin film in the present invention. Particularly preferred are urethane adhesives. A so-called dry lamination process is preferably adopted as the lamination technique.

The composite film formed by laminating the polybutylene terephthalate resin film and the polystyrene resin film according to the above-mentioned process can be laminated suing a hot roll or the like without using an adhesive. However, in such a case, a foamed polystyrene sheet should be used which does not have any other thermoplastic resin film laminated on that surface which is to then be laminated onto the polybutylene terephthalate film. The polybutylene terephthalate resin film can be directly laminated on the foamed polystyrene sheet according to the intended use, but it is preferred in view of the adhesive and the bonding methods that the polybutylene terephthalate resin film be bonded to the polystyrene film in advance and that the foamed polystyrene sheet then be bonded and laminated to the polystyrene film side.

In the present invention, the thickness of the composite sheet is not particularly critical. However, in view of its intended use as a container for cooking in a microwave oven, its formability into a container and its heat resistance of the container, the overall thickness of the composite sheet is between to 0.5 to 7 mm, preferably 0.8 to 3 mm, and the thickness of the polybutylene terephthalate resin film is preferably 5 to 200 μm.

When a polybutylene terephthalate resin film is bonded as a lid member to the container of the present invention, the oxygen permeability can be further reduced, and a container having excellent long-term food preservative effects can be provided.

EXAMPLES

EXAMPLE 1

A non-oriented polybutylene terephthalate resin film (having a thickness of 30 μm) formed by T-die extrusion was laminated on a polystyrene resin film (having a thickness of 20 μm) by the dry lamination process. The laminated film was further laminated on a foamed polystyrene resin sheet (PSP) having a thickness of 1.5 mm by a hot roll so that the polybutylene terephthalate resin film layer formed an outermost layer. The obtained laminate as shown in FIG. 1 was formed at 110° C. into a container as shown in FIG. 3 by a hot press so that the polybutylene terephthalate resin film layer was located on the inner side. A commercially available food was packed in the container and a heat resistance test was carried out by heating and cooking the food in a microwave oven. The change of the food flavor by cooking was examined. The results are shown in Table 1.

In the heat resistance test, the heat resistance was evaluated according to the following criteria based on the degree of deformation of the container.
O: no deformation
Δ: slight deformation
X: conspicuous deformation The flavor of the cooked food was evaluated according to the following criteria.
O: no polymer smell
Δ: slight polymer smell
X: polymer smell

EXAMPLE 2

A polybutylene terephthalate resin film having a thickness of 30 μm, obtained by the inflation process, was laminated on a polystyrene resin film (having a thickness of 20 μm) through a urethane adhesive by the dry lamination process. The obtained laminated film was further laminated on a foamed polystyrene sheet (PSP) having a thickness of 1.5 mm by a hot roll so that the polybutylene terephthalate resin film layer would form an outermost layer. A container similar to the one obtained in Example 1 was obtained by heat-forming the obtained laminate so that the polybutylene terephthalate resin film was located on the inner side. The obtained container was tested in the same manner as the one described in Example 1. The results are shown in Table 1.

COMPARATIVE EXAMPLE 1

A non-oriented polypropylene resin film (having a thickness of 30 μm) was laminated on a polystyrene resin film (having a thickness of 20 μm) according to the dry lamination process. The laminated film was further laminated on a foamed polystyrene sheet (PSP) having a thickness of 1.5 mm by a hot roll so that the polypropylene resin film would form an outermost layer. A container was prepared by heat-forming the laminate so that the polypropylene resin film layer was located on the inner side. The container was tested in the same manner as the one described in Example 1. The results are shown in Table 1.

COMPARATIVE EXAMPLE 2

A container was prepared in the same manner as the one described in Comparative Example 1 except that a non-oriented polyethylene resin film was used instead of the non-oriented polypropylene resin film (having a thickness of 30 μm). The container was tested in the same manner as that described in Example 1. The results are shown in Table 1.

COMPARATIVE EXAMPLE 3

A container was prepared in the same manner as the one described in Comparative Example 1 except that a non-oriented polyethylene terephthalate resin film was used instead of the non-oriented polypropylene resin film (having a thickness of 30 μm). The obtained container was tested in the same manner as that described in Example 1. The obtained results are shown in Table 1.

butylene terephthalate resin film (having a thickness of 30 μm) as that used for the container was heat-sealed to the container. The container was then stored for 6 months in an atmosphere maintained at a temperature of 30° C. and a relative humidity of 60%. Thereafter the container was opened and the degree of deterioration of the salad oil was examined. Furthermore, the oxygen permeability of the container was measured. The results are shown in Table 2.

EXAMPLE 4

The container obtained in Example 2 was filled with salad oil, and a lid made of the same nonoriented polybutylene terephthalate resin film (having a thickness of 30 μm) as the one used for the container was heat-sealed to the container. The container was then stored for 6 months in an atmosphere maintained at a temperature of 30° C. and a relative humidity of 60%. The container was thereafter opened and the degree of deterioration of the salad oil was examined Furthermore, the oxygen permeability of the container was measured. The results are shown in Table 2.

COMPARATIVE EXAMPLES 4 AND 5

In the same manner as that described in Example 3, each of the containers obtained in Comparative Examples 1 and 2 was filled with salad oil, and a lid made of a non-oriented polybutylene terephthalate resin film (having a thickness of 30 μm) prepared according to the T-die process was attached to each container. The degree of deterioration was examined in the same manner as the one described in Example 3, and the oxygen permeability of each container was measured. The results are shown in Table 2.

COMPARATIVE EXAMPLE 6

In the same manner as the one described in Example 3, the container used in Example 1 was filled with salad oil, and a lid member made of a nonoriented polyethylene resin film (having a thickness 30 μm) was attached

TABLE 1

| Construction of container*[1] | | Ex. 1 PBT/PS/PSP | | Ex. 2 PBT/PS/PSP | | Comp. Ex. 1 CPP/PS/PSP | | Comp. Ex. 2 LDPE/PS/PSP | | Comp. Ex. 3 PET/PS/PSP | |
|---|---|---|---|---|---|---|---|---|---|---|---|
| Cooked food | Cooking time | degree of deformation | smell | degree of deformation | smell | degree of deformation | smell | degree of deformation | smell | degree of deformation | smell |
| water (100 g) | 10 min. | O | O | O | O | O | Δ | O | Δ | Δ | O |
| salad oil (30 g) | 5 min. | O | O | O | O | Δ | Δ | X | X | X | O |
| cream stew (100 g) | 2 min. | O | O | O | O | O | Δ | X | X | X | O |
| pork cutlet (100 g) | 2 min. | O | O | O | O | O | Δ | X | Δ | Δ | O |
| spaghetti (100 g) | 2 min. | O | O | O | O | O | Δ | X | X | X | O |
| meat ball (100 g) | 2 min. | O | O | O | O | O | Δ | X | X | Δ | O |

*[1]PBT: non-oriented polybutylene terephthalate film
PS: polystyrene film
PSP: foamed polystyrene sheet
CPP: non-oriented polypropylene film
LDPE: low-density polyethylene film
PET: non-oriented polyethylene terephthalate film

EXAMPLE 3

The container obtained in Example 1 was filled with salad oil, and a lid made of the same nonoriented polyto the container. In the same manner as that described in Example 3, the degree of deterioration was examined, and the oxygen perpeability was measured. The results are shown in Table 2.

TABLE 2

| | Ex. 3 | Ex. 4 | Comp. Ex. 4 | Comp. Ex. 5 | Comp. Ex. 6 |
|---|---|---|---|---|---|
| Construction of container | PBT/PS/PSP | PBT/PS/PSP | CPP/PS/PSP | LDPE/PS/PSP | PBT/PS/PSP |
| Lid member | PBT | PBT | PBT | PBT | LDPE |
| | (T-die process) | (T-die process) | (T-die process) | (T-die process) | (inflation process) |

TABLE 2-continued

| | Ex. 3 | Ex. 4 | Comp. Ex. 4 | Comp. Ex. 5 | Comp. Ex. 6 |
| --- | --- | --- | --- | --- | --- |
| Degree of deterioration of salad oil | no deterioration | no deterioration | slight deterioration | deterioration | deterioration |
| Oxygen permeability of container[*4] (cc/m$^2$ · day · atm) | 99 | 61 | 3300 | 4500 | 5500 |

[*4]oxygen permeability: measured according to ASTM D-1434 by using a gas permeability tester mfd. by Toyo Seiki

I claim:

1. A heat-resistant composite sheet composed, as the main constituents, either of a foamed polystyrene sheet and a polybutylene terephthalate resin film, or of a foamed polystyrene sheet, a polystyrene resin film and a polybutylene terephthalate resin film, wherein the polybutylene terephthalate resin film layer is laminated to form both or one of the outer layers.

2. A heat-resistant composite sheet as set forth in claim 1, wherein the thickness of the polybutylene terephthalate resin film is 5 to 200 µm and the overall thickness of the composite sheet is 0.5 to 7 mm.

3. A heat-resistant container made of a heat-resistant composite sheet as set forth in claim 1 or 2, wherein the composite sheet is arranged so that the polybutylene terephthalate resin film layer of the composite sheet is located on the inner side of the container.

4. A heat-resistant container as set forth in claim 3, wherein a lid member composed of a polybutylene terephthalate resin film as the main constituent is bonded to the container.

* * * * *

UNITED STATES PATENT AND TRADEMARK OFFICE
CERTIFICATE OF CORRECTION

PATENT NO. : 4,943,459

DATED : July 24, 1990

INVENTOR(S) : NEDZU

It is certified that error appears in the above-identified patent and that said Letters Patent is hereby corrected as shown below:

Column 1, line 8, after "container" delete the comma (,);
line 34, after "polystyrene" delete ")" and insert a comma (,) and after "limited" insert a period (.);
line 37, after "improves" delete "in";
line 39, after "insufficient" delete "so that it" and insert --. It--;
line 40, before "not" insert --therefore-- and after "containing" delete "of an";
line 53, after "in" delete "the";
line 56, after "that" delete "no";
line 61, after "is" delete "providing" and insert --provided--;
line 64, after "impair" delete the comma(,).

Column 2, line 1, change "foam" to --foamed--;
line 39, after "includes" insert --a--;
line 55, after "film" delete "should".

Column 3, line 28, after "be" delete "attained, namely," and insert --used--;
line 29, delete "not" and insert --capable of being--;
line 34, after "that" delete "as".

Column 4, line 2, after "laminated" delete "suing" and insert --using--;
line 20, after "between" delete "to".

UNITED STATES PATENT AND TRADEMARK OFFICE
CERTIFICATE OF CORRECTION

PATENT NO. : 4,943,459

DATED : July 24, 1990

INVENTOR(S) : Nedzu

It is certified that error appears in the above-identified patent and that said Letters Patent is hereby corrected as shown below:

Column 6, line 62, after "oxygen" change "perpeability" to --permeability--

Signed and Sealed this

Fourth Day of February, 1992

Attest:

HARRY F. MANBECK, JR.

Attesting Officer

Commissioner of Patents and Trademarks